United States Patent
Wada et al.

(10) Patent No.: US 9,804,387 B2
(45) Date of Patent: Oct. 31, 2017

(54) IMAGING APPARATUS

(71) Applicant: PANASONIC INTELLECTUAL PROPERTY MANAGEMENT CO., LTD., Osaka (JP)

(72) Inventors: Jyouji Wada, Kanagawa (JP); Yoshihito Urashima, Fukuoka (JP); Akihiro Iizuka, Fukuoka (JP); Hideaki Yamada, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/294,949

(22) Filed: Oct. 17, 2016

(65) Prior Publication Data

US 2017/0115480 A1   Apr. 27, 2017

(30) Foreign Application Priority Data

Oct. 23, 2015 (JP) .................................. 2015-208847

(51) Int. Cl.
G02B 27/00 (2006.01)
G03B 17/56 (2006.01)
G03B 15/02 (2006.01)
G03B 11/00 (2006.01)

(52) U.S. Cl.
CPC .......... *G02B 27/0006* (2013.01); *G03B 11/00* (2013.01); *G03B 15/02* (2013.01); *G03B 17/568* (2013.01)

(58) Field of Classification Search
CPC ..... B60S 1/3418; B60S 1/0844; B60S 1/0848
See application file for complete search history.

(56) References Cited

U.S. PATENT DOCUMENTS

| | | | | |
|---|---|---|---|---|
| 2,811,735 | A * | 11/1957 | Oishei | B60S 1/105 15/250.13 |
| 9,530,211 | B2 | 12/2016 | Mochizuki et al. | |
| 2002/0139394 | A1* | 10/2002 | Bronson | B08B 17/02 134/6 |
| 2009/0284596 | A1* | 11/2009 | Lin | H04N 5/2252 348/143 |
| 2014/0043478 | A1 | 2/2014 | Burton | |
| 2014/0267715 | A1* | 9/2014 | Kemege | G02B 27/0006 348/143 |

FOREIGN PATENT DOCUMENTS

| | | |
|---|---|---|
| JP | 2002-369038 | 12/2002 |
| JP | 2009-055180 | 3/2009 |
| JP | 2013-085204 | 5/2013 |

* cited by examiner

*Primary Examiner* — Clayton E Laballe
*Assistant Examiner* — Noam Reisner
(74) *Attorney, Agent, or Firm* — Greenblum & Bernstein, P.L.C.

(57) ABSTRACT

An imaging apparatus includes a camera front light-transmission plate that covers a front surface of a camera, an auxiliary device addition space which has a virtual surface obtained by an exterior surface of the camera front light-transmission plate being extended, and in which an auxiliary imaging device is provided, and a wiper that wipes the exterior surface of the camera front light-transmission plate by moving along the exterior surface and that moves to the virtual surface.

17 Claims, 7 Drawing Sheets

IMAGING APPARATUS

BACKGROUND

1. Technical Field

The present disclosure relates to an imaging apparatus.

2. Description of the Related Art

An imaging apparatus (for example, surveillance camera) for outdoor use of which an imaging direction can be changed by driving a motor, and which can perform imaging at night is known (U.S. Unexamined Patent Application Publication No. 2014/0043478). A camera drive housing is fixed to a mounting base of the surveillance camera. An upper part of the camera drive housing can be pan-pivoted about a pan-axis by a mounted pan-shaft drive motor. Base ends of a pair of parallel tilt-supporting arms are fixed to the upper part of the camera drive housing. Tips of the pair of tilt-supporting arms support a camera housing therebetween. The camera housing is tilt-rotatable about a tilt-axis which is spaced away from and perpendicular to the pan-axis, and is fixed to the tips of the pair of tilt-supporting arms. The camera housing is tilt-rotated by a mounted tilt-drive motor.

A camera is mounted in the camera housing. A camera window is provided on the front surface of the camera housing in order to allow visible light and infrared light transmitted therethrough to be incident to the camera. In the camera housing, a wiper that wipes the camera window is provided so as to be rotatable by driving of the motor. In addition, an illumination housing is fixed to and integrated with the upper part of the camera housing. An illumination device is mounted in the illumination housing. The illumination device emits illumination light through an opening provided in the illumination housing. The opening in the illumination housing is covered with an illumination window. The illumination device emits the illumination light along an optical axis of a camera lens. By the camera housing and the illumination housing being integrated, the surveillance camera changes a direction of illumination light in accordance with a pan or tilt operation of the camera.

In the surveillance camera of U.S. Unexamined Patent Application Publication No. 2014/0043478, dust or snow accretions generated on an illumination window reduces brightness. Providing a wiper dedicated to an illuminator in addition to a wiper for wiping the camera window in order to address the above issue complicates the structure of surveillance camera.

SUMMARY

In view of the above circumstances, the present disclosure provides an imaging apparatus that cleans a front light-transmission plate of the camera and a front light-transmission plate of an auxiliary imaging device without complicating the structure.

The imaging apparatus according to the present disclosure includes a camera front light-transmission plate that covers a front surface of a camera, an auxiliary device addition space which has a virtual surface obtained by an exterior surface of the camera front light-transmission plate being extended, and in which an auxiliary imaging device is provided, and a wiper that wipes the exterior surface of the camera front light-transmission plate by moving along the exterior surface and that moves to the virtual surface.

According to the present disclosure, the front light-transmission plate of the camera and the front light-transmission plate of the auxiliary imaging device can be cleaned without complicating the structure.

DETAILED DESCRIPTION

Figure 1:
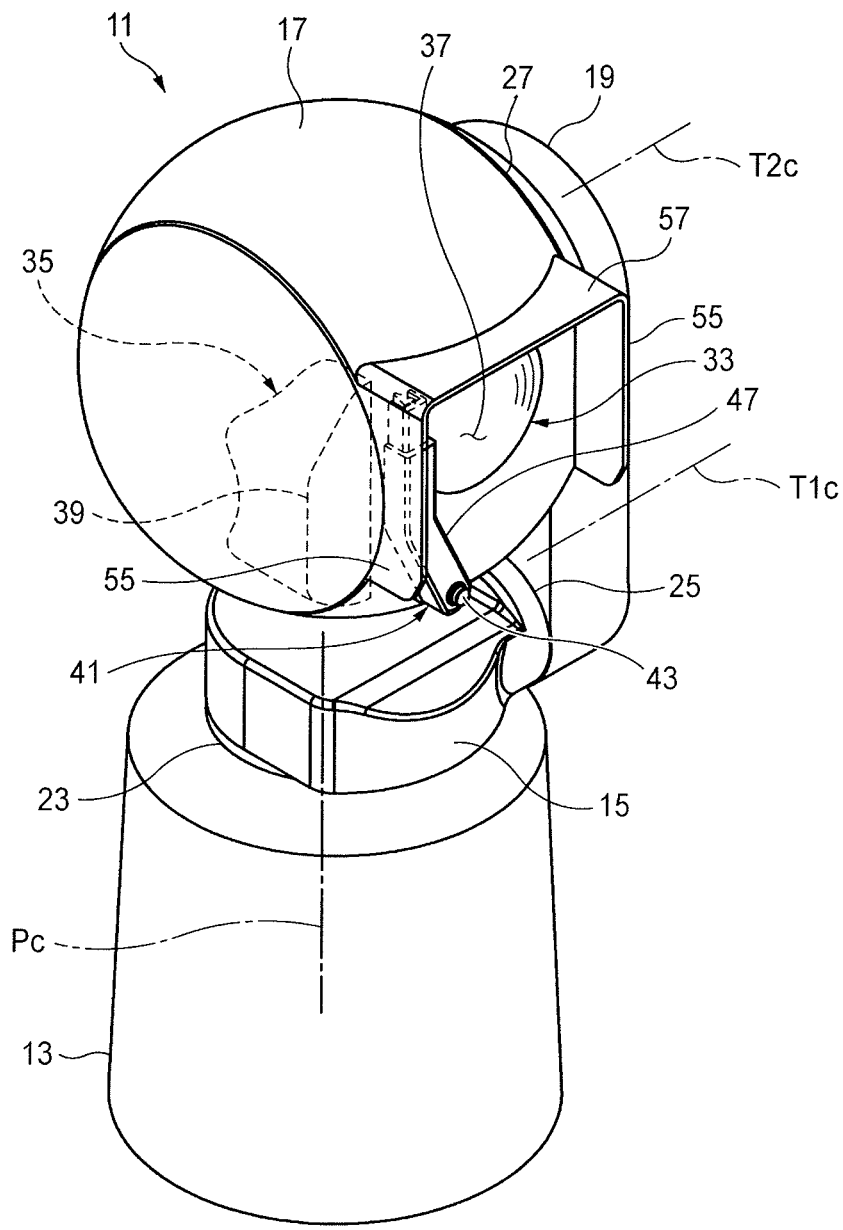
FIG. 1 is a perspective view illustrating an appearance of a surveillance camera according to a first exemplary embodiment.

Hereinafter, exemplary embodiments will be described in detail with reference to appropriate drawings. However, in some cases, needlessly detailed descriptions will not be made. For instance, in some cases, matters which are already well known will not be described in detail or practically the same configurations will not be described repeatedly. That is to avoid the following descriptions being needlessly long, and to promote understanding in those skilled in the art. The accompanying drawings and the following descriptions are provided to help those skilled in the art sufficiently understand the present disclosure. The drawing and the descriptions are not intended to limit the scope of the claims.

In the following exemplary embodiments, a surveillance camera that has a wiper will be described as an example of an imaging apparatus. In the exemplary embodiments below, a tilt-axis may be used as a term which refers to both a virtual axis (tilt-rotation center) and a physical tilt-shaft. Similarly, a pan-axis may be used as a term which refers to both a virtual axis (pan-rotation center) and a physical pan-shaft.

(First Exemplary Embodiment)

[Configurations and the Like]

FIG. 1 is a perspective view illustrating an appearance of surveillance camera 11 according to a first exemplary embodiment.

Surveillance camera 11 includes main body housing 13, pan housing 15, and tilt housing 17. The lower surface of main body housing 13 (surface on the lower side of FIG. 1) is a mounting surface. Main body housing 13 is, for example, substantially shaped into a cylinder of which a diameter on a mounting surface side is slightly larger than a diameter on a side opposite to the mounting surface side. The mounting surface of main body housing 13 of surveillance camera 11 is fixed to a fixing object by a fastener, such as a bolt.

Supporting arm 19 is attached to pan housing 15. Pan housing 15 is supported by an upper surface of main body housing 13 so as to be pan-rotatable about pan-axis Pc. Pan-axis Pc coincides with the axis of main body housing 13.

A side portion of pan housing 15 supports a base end of one supporting arm 19. That is, supporting arm 19 integrally pan-rotates with pan housing 15. Pan housing 15 supports the base end of supporting arm 19 so as to be rotatable about first tilt-axis T1c which is spaced away from and perpendicular to pan-axis Pc. In other words, supporting arm 19 is tiltable with respect to first tilt-axis T1c. Supporting arm 19 rises from pan housing 15, and a tip of supporting arm 19 supports tilt housing 17.

Tilt housing 17 is, for example, substantially shaped into a sphere. A part of spherical tilt housing 17 is cut out. In place of this part, the tip of supporting arm 19 is disposed. One end of tilt housing 17 in a diameter direction which is at the tip of supporting arm 19 is supported so as to be tilt-rotatable about second tilt-axis T2c which is parallel to first tilt-axis T1c.

For example, second tilt-axis T2c passes through the center of tilt housing 17 which has a spherical shape. Tilt housing 17 is spaced upwardly away from pan housing 15, and is supported by supporting arm 19. In other words, tilt housing 17 is tilt-rotatable about two rotation centers at the upper and lower ends of the supporting arm, one being first tilt-axis T1c and the other being second tilt-axis T2c. Accordingly, tilt housing 17 is able to be pushed out from pan housing 15 (moving in a direction of separating away from pan-axis Pc).

Figure 4:
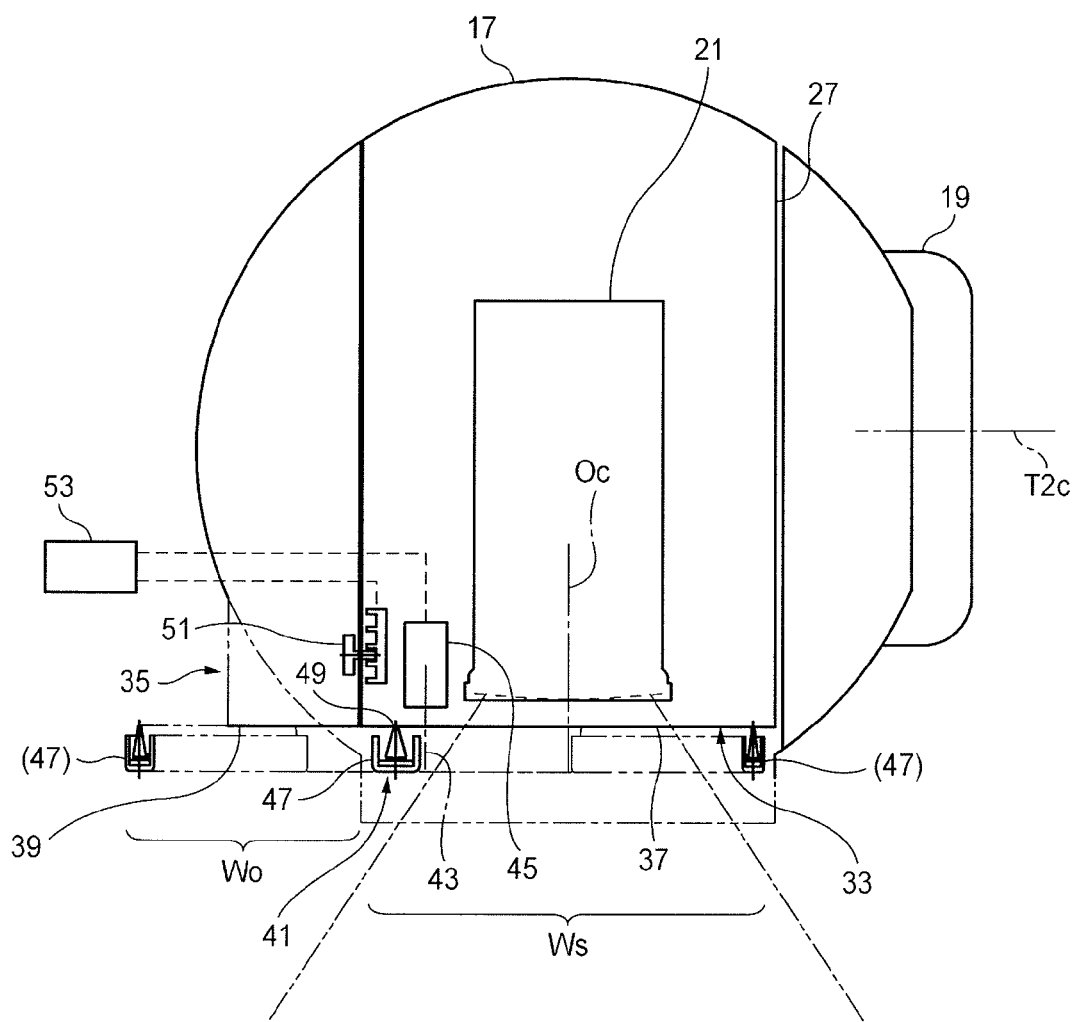
FIG. 4 is a plan view of the tilt housing illustrated in FIG. 1.

Tilt housing 17 accommodates camera 21 in the inside thereof (refer to FIG. 4). Camera 21 includes an imaging unit that has an image sensor or a lens. Camera 21 is disposed along optical axis Oc (refer to FIG. 4) of the lens of camera 21 (not illustrated) in a direction perpendicular to second tilt-axis T2c.

Optical axis Oc of camera 21 does not cross second tilt-axis T2c. That is, optical axis Oc of camera 21 is disposed on an opposite side of pan housing 15 with second tilt-axis T2c being interposed therebetween in a case where camera 21 images in a direction parallel to the mounting surface. In other words, camera 21 is disposed at a position where optical axis Oc has shifted above second tilt-axis T2c (opposite side of pan housing 15).

In surveillance camera 11, pan-rotation unit 23 is provided between main body housing 13 and pan housing 15. First tilt-rotation unit 25 is provided between pan housing 15 and supporting arm 19. Second tilt-rotation unit 27 is provided between supporting arm 19 and tilt housing 17.

Data regarding imaging information and a motor control signal for pan-rotation unit 23, first tilt-rotation unit 25, and second tilt-rotation unit 27 are transmitted through, for example, power-line communication (PLC) that is a non-contact type communication which uses an antenna.

In surveillance camera 11, power is transmitted to pan-rotation unit 23 through, for example, a slip ring. In addition, power is transmitted to first tilt-rotation unit 25 and second tilt-rotation unit 27 through, for example, a twisted line.

Pan-rotation unit 23, first tilt-rotation unit 25, and second tilt-rotation unit 27 of surveillance camera 11 have a water-tight structure. Pan-rotation unit 23, first tilt-rotation unit 25, and second tilt-rotation unit 27 have a waterproof structure where, for instance, a clearance between a shaft and a bearing is closed with a waterproof sealant that is in contact with both the shaft and the bearing. Accordingly, surveillance camera 11 can be used outdoors without a domed cover covering surveillance camera 11.

Figure 2:
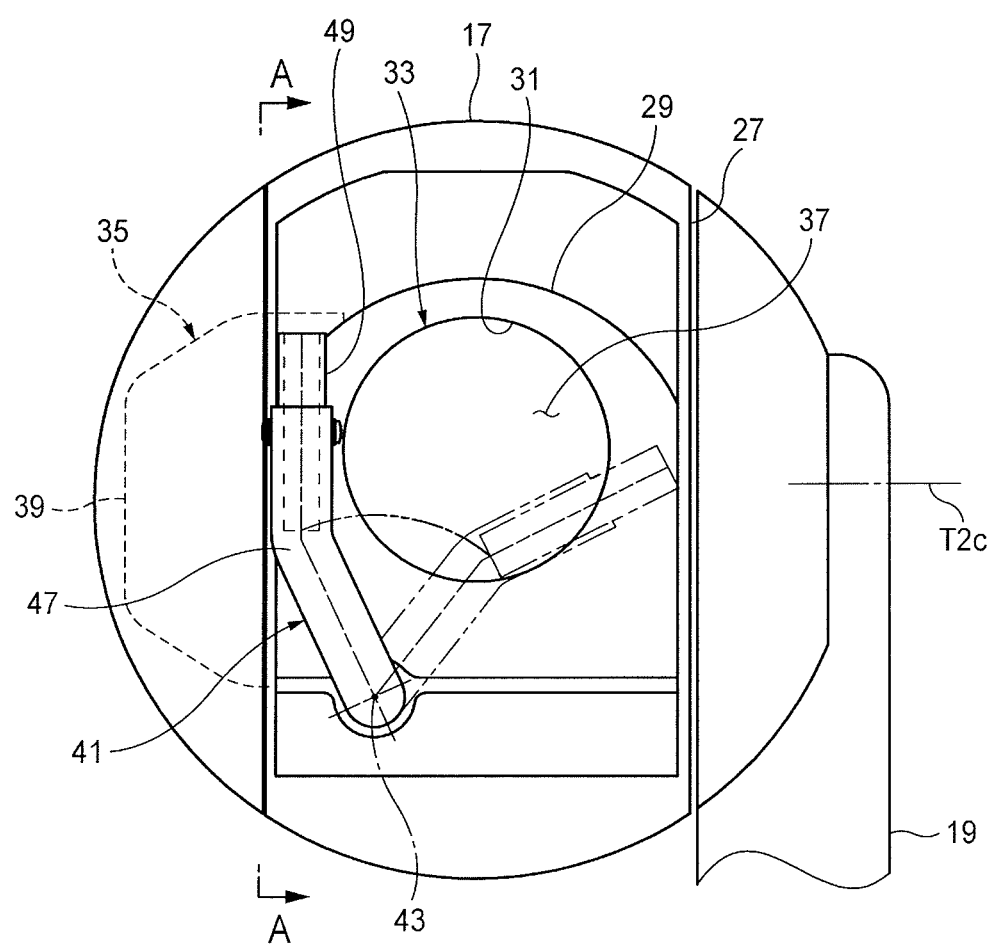
FIG. 2 is a front view of a tilt housing illustrated in FIG. 1.

FIG. 2 is a front view of tilt housing 17 illustrated in FIG. 1.

Flat surface 29 that is perpendicular to optical axis Oc of camera 21 is formed on the outer surface of tilt housing 17. Imaging light incident window 31 through which imaging light is incident to camera 21 is opened on flat surface 29. Imaging light incident window 31 is covered with camera front glass 33 that can transmit visible light and infrared light. In other words, a front surface of camera 21 is covered with camera front glass 33.

On a side opposite to supporting arm 19, auxiliary device addition space 35 is reserved on one outside surface of tilt housing 17 with camera front glass 33 being interposed therebetween. An auxiliary imaging device is attached within auxiliary device addition space 35 when specifications or options of surveillance camera 11 are added. Auxiliary device addition space 35 includes virtual surface 39 obtained by exterior surface 37 of camera front glass 33 being extended. In other words, exterior surface 37 of camera front glass 33 and virtual surface 39 are the same the same planar surface. The auxiliary imaging device includes, for example, an illumination device, a non-visible light camera (infrared camera or the like), or visible light camera.

By the side of auxiliary device addition space 35 under camera front glass 33, rotation drive shaft 43 of wiper 41 is disposed on flat surface 29 of tilt housing 17. Rotation drive shaft 43 is driven by wiper motor 45 (refer to FIG. 4) accommodated in tilt housing 17. Rotation drive shaft 43 extends along a direction of optical axis Oc of camera 21. A base end of wiper 41 is rotated in a normal or a reverse direction by rotation drive shaft 43. The right and the left positions of wiper 41 illustrated in FIG. 2 indicate moving range (stroke) of wiper 41 in a case where the auxiliary imaging device is not added within auxiliary device addition space 35.

Wiper 41 includes wiper arm 47 that extends toward a tip of wiper 41 from the base end of wiper 41. Wiper arm 47 swings (reciprocates) by the base end being rotated in a normal or a reverse direction. Blade 49 (wiping member) made of rubber or the like is attached to wiper arm 47. Camera front glass 33 is disposed within the trajectory of blade 49 (within the moving range).

Figure 3:
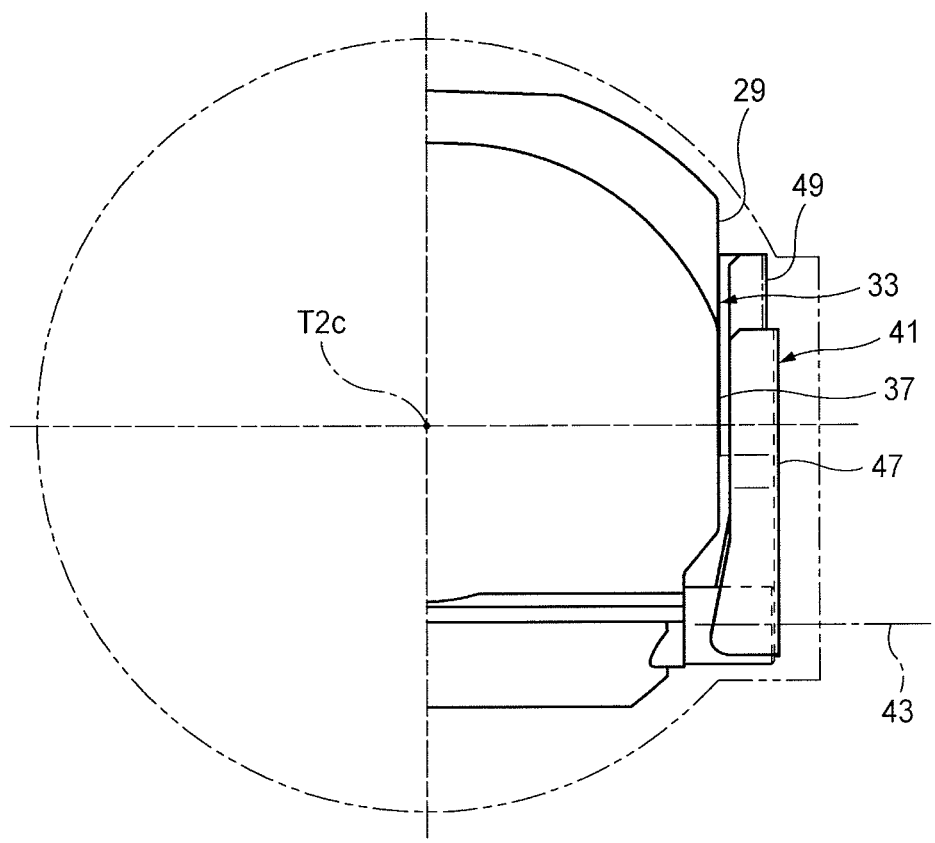
FIG. 3 is a side view of main elements taken along solid line A-A of FIG. 2.

FIG. 3 is a side view of main elements taken along solid line A-A of FIG. 2.

Wiper 41 moves along exterior surface 37 of camera front glass 33 while maintaining contact with blade 49. Accordingly, dirt or the like on exterior surface 37 of camera front glass 33 is wiped away by wiper 41.

In the vicinity of auxiliary device addition space 35, option detecting sensor 51 (refer to FIG. 4) may be provided within tilt housing 17. Option detecting sensor 51 detects whether or not the auxiliary imaging device is added within auxiliary device addition space 35. Detection information acquired by option detecting sensor 51 is transmitted to controller 53 of surveillance camera 11. Controller 53 controls a normal or a reverse rotation angle of wiper motor 45 based on the detection information from option detecting sensor 51. Accordingly, the moving range of wiper 41 is changed such that wiper 41 can move to virtual surface 39 depending on whether the auxiliary imaging device is provided or not.

For example, option detecting sensor 51 detects the presence or the absence of the auxiliary imaging device by being pressed by the provided auxiliary imaging device. Option detecting sensor 51 includes, for example, a limit switch. Option detecting sensor 51 may transmit information of whether the auxiliary imaging device is provided or not by a manual switch, such as a DIP switch or the like, being switched on and off.

Option detecting sensor 51 may detect the presence or the absence of side surface light-shielding plates 55. When surveillance camera 11 has specifications in which the auxiliary imaging device is not added, a pair of side surface light-shielding plates 55 may be attached to the right and the left of surveillance camera 11 with camera front glass 33 being interposed therebetween. Upper surface light-shielding plate 57 may be provided above an area between the pair of side surface light-shielding plates 55.

Once the auxiliary imaging device is added, one side surface light-shielding plate 55 positioned between the auxiliary imaging device and camera front glass 33 out of the pair of side surface light-shielding plates 55 becomes unnecessary since one side surface light-shielding plate 55 interferes with wiper arm 47. Therefore, the moving range of wiper 41 may be changed by the removal of one side surface light-shielding plate 55 positioned between the auxiliary imaging device and camera front glass 33 being detected by a sensor, such as the limit switch.

FIG. 4 is a plan view of tilt housing 17 illustrated in FIG. 1.

Wiper 41 can move to virtual surface 39 by controller 53 causing wiper motor 45 to rotate. That is, wiper 41 reciprocates within an area of first cleaning region Ws in a case where the auxiliary imaging device is not added. In contrast, once auxiliary imaging device is added, wiper 41 reciprocates within an area of first cleaning region Ws and second cleaning region Wo combined.

Figure 5:
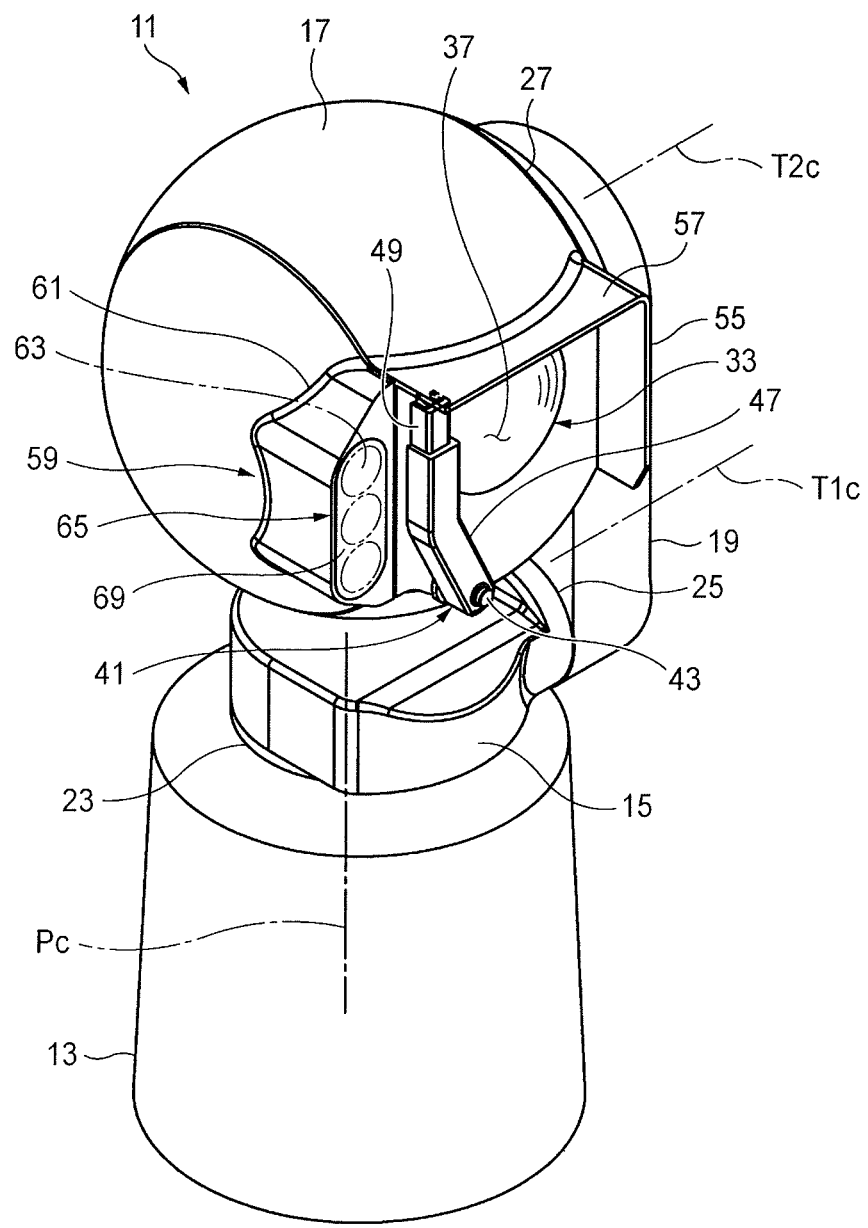
FIG. 5 is a perspective view of an appearance of the surveillance camera to which an illumination device has been added.

FIG. 5 is a perspective view of an appearance of surveillance camera 11 to which illumination device 59 has been added as the auxiliary imaging device.

Illumination device 59 has illumination housing 61. Illumination housing 61 accommodates light source 63 that includes, for instance, light-emitting diodes (LEDs). Illumination device front glass 65 that covers light source 63 is attached to a front surface of illumination housing 61. As described above, the exterior of illumination device 59 includes illumination housing 61 and illumination device front glass 65.

The volume of auxiliary device addition space 35 is substantially the same as the volume of illumination device 59. A fixing structure that allows illumination device 59 to be attached (for example, retrofitting) is provided in tilt housing 17 in advance. An engaging structure in which an elastic engaging claw is engaged with an engaging recess, a fastening structure in which a screw is screwed with a screw hole, and the like are examples of the fixing structure.

In surveillance camera 11, for example, option detecting sensor 51 detects whether or not illumination device 59 is added once illumination device 59 is attached to tilt housing 17. Once the detection information is transmitted to controller 53, controller 53 controls the rotation of wiper motor 45 and causes wiper 41 to move to second cleaning region Wo based on the detection information.

Figure 6:
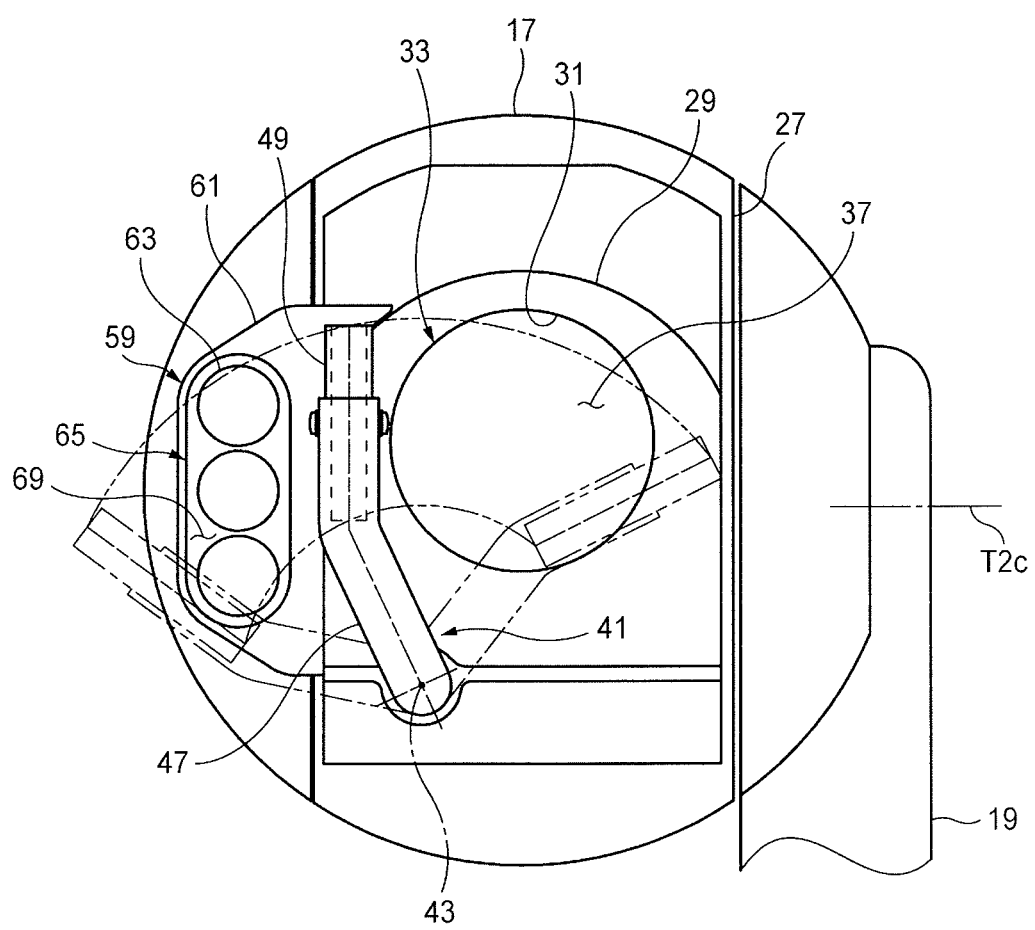
FIG. 6 is a front view of the tilt housing illustrated in FIG. 5.

FIG. 6 is a front view of tilt housing 17 illustrated in FIG. 5.

When wiper 41 is not being used in the daytime, for example, wiper arm 47 is disposed between camera front glass 33 and illumination device 59. In contrast, when wiper 41 is not being used at night, for example, wiper arm 47 is disposed on a side opposite to illumination device 59 with camera front glass 33 being interposed therebetween. Controller 53 controls the position of wiper arm 47 when wiper arm 47 is not being used (stop position).

Wiper 41 may be disposed at a position which does not fall under an imaging area of camera 21 when wiper 41 is not being used at night although one end of the moving range that is on the side opposite to illumination device 59 with camera front glass 33 being interposed therebetween overlaps the front surface of camera 21 in FIG. 6. In other words, although not illustrated, the moving range of wiper 41 may be expanded to a supporting arm 19 side beyond the state illustrated in FIG. 6 and wiper 41 may be disposed on an end of supporting arm 19. In addition, the moving range of wiper 41 may be expanded to an auxiliary imaging device side. When wiper 41 is not being used at night, wiper 41 may be disposed at the end of moving range of wiper 41 which is on the illumination device 59 side within a range in which illumination light of illumination device is not blocked.

A photoelectric sensor or a timer may be connected to controller 53. Controller 53 detects whether it is daytime or night based on detection information acquired from the photoelectric sensor or the timer. Controller 53 causes wiper motor 45 to rotate and controls the stop position of wiper arm 47 when wiper 41 is not being used based on daytime or night detection information.

Daytime is an example of a non-illumination period in which illumination device 59 is not lit or not flickering. Night is an example of an illumination period in which illumination device 59 is lit or flickering. For instance, in a case where an external illumination device is lit up and thus the amount of light detected by the photoelectric sensor is large even at night, controller 53 may be operated as in the non-illumination period. In addition, in a case where the amount of light detected by the photoelectric sensor is small even in the daytime, for example, due to the effect of bad weather, controller 53 may be operated as in the illumination period.

Figure 7:
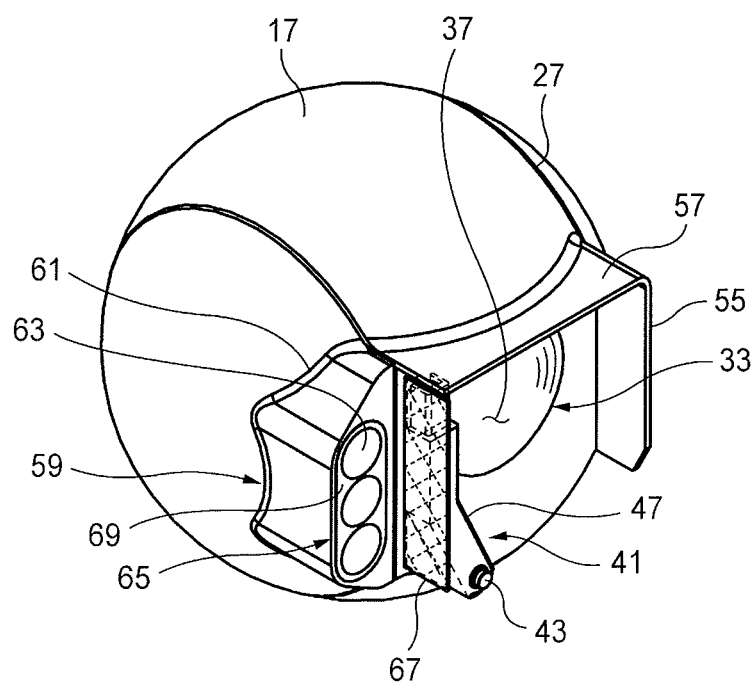
FIG. 7 is a perspective view of main elements of a surveillance camera, according to a modification example, in which a light-shielding plate is attached to a wiper.

FIG. 7 is a perspective view of main elements of surveillance camera 11, according to a modification example, in which light-shielding plate 67 is attached to wiper 41.

In surveillance camera 11, light-shielding plate 67 that rises from and is perpendicular to exterior surface 37 of camera front glass 33 may be attached to wiper arm 47 of wiper 41. Accordingly, surveillance camera 11 can restrict ambient light (for instance, sunlight) from being incident to camera 21, and thereby image quality can be improved. For example, light-shielding plate 67 and side surface light-shielding plates 55 are formed in substantially the same shape. Light-shielding plate 67 may be attachable or detachable with respect to wiper arm 47.

Once illumination device 59 is added, one side surface light-shielding plate 55 is removed from surveillance camera 11 as described above. Surveillance camera 11 may have a structure in which removed side surface light-shielding plate 55 is diverted so as to be attached to wiper arm 47 as light-shielding plate 67. In this case, by side surface light-shielding plate 55 being detached from surveillance camera 11, stroke change information of wiper arm 47 can be transmitted to controller 53. Detached side surface light-shielding plate 55 can be attached to wiper arm 47 as light-shielding plate 67 and can block sunlight. In addition, it becomes unnecessary to store removed side surface light-shielding plate 55 by attaching detached side surface light-shielding plate 55 to wiper arm 47.

As described above, side surface light-shielding plates 55 of surveillance camera 11 can be given with various additional values. Therefore, surveillance camera 11 is restricted from having a large number of components, and is prevented from having an excessively large structure, thereby having an even smaller size.

[Effects and the Like]

Hereinafter, effects of surveillance camera 11 will be described.

In surveillance camera 11, auxiliary device addition space 35 is reserved beside camera front glass 33. In a case where illumination device 59 is added within auxiliary device addition space 35, virtual surface 39 becomes exterior surface 69 of illumination device front glass 65 that has been added (refer to FIG. 6). In other words, exterior surface 37 of camera front glass 33 becomes the same planar surface as exterior surface 69 of illumination device front glass 65.

Wiper 41 moves along exterior surface 37 of camera front glass 33 and wipes exterior surface 37. In addition, wiper 41 can move to virtual surface 39. The moving range of wiper 41 is changed by controller 53 controlling wiper motor 45 based on detection information acquired from option detecting sensor 51. In other words, wiper 41 can wipe illumination device front glass 65 as well.

Therefore, surveillance camera 11 can clean both camera front glass 33 and illumination device front glass 65 with one wiper 41. Accordingly, dirt, raindrops, dew condensation, and the like attached to camera front glass 33 and illumination device front glass 65 are wiped away. Accordingly, in surveillance camera 11, image quality of an image captured by camera 21 can be improved, and decrease in brightness of illumination light emitted by illumination device 59 can be restricted.

In surveillance camera 11, wiper 41 wipes camera front glass 33 and reciprocates within a moving range in which virtual surface 39 is not reached by wiper 41 in a case where the auxiliary imaging device is not added. A part of virtual surface 39 may be included in the moving range.

Once the auxiliary imaging device is provided in auxiliary device addition space 35, the moving range of wiper 41 is changed by the control of controller 53 to a range in which wiper 41 can reach virtual surface 39. The moving range of wiper 41 is changed based on detection results acquired by, for example, a sensor which detects the presence or the absence of the auxiliary imaging device. The moving range of wiper 41 may be changed by the removal of one side surface light-shielding plate 55 positioned between the auxiliary imaging device and camera front glass 33 being detected by the sensor.

Accordingly, surveillance camera 11 can restrict unnecessary operation of wiper 41 by a range that requires wiping and the moving range of wiper 41 being combined.

In surveillance camera 11, wiper 41 is disposed so as to protrude from exterior surface 37 of camera front glass 33 in a perpendicular direction. In addition, once illumination device 59 is added, side surface light-shielding plate 55 between illumination device 59 and camera front glass 33 is removed from surveillance camera 11.

During the non-illumination period of illumination device 59, wiper 41 may be disposed between camera front glass 33 and illumination device 59. In this case, wiper 41 can block, for example, sunlight that is incident from an obliquely upward side of illumination device 59 side to camera front glass 33 as a substitute of removed side surface light-shielding plate 55.

In contrast, during the illumination period of illumination device 59, wiper 41 may be disposed on the side opposite to illumination device 59 with camera front glass 33 being interposed therebetween. Once wiper 41 is disposed on the side opposite to illumination device 59, a member that is in between illumination device 59 and camera front glass 33 and that protrudes from exterior surface 37 in the perpendicular direction is removed from surveillance camera 11. Accordingly, surveillance camera 11 can restrict vignetting caused by illumination light when a subject at a near distance is irradiated with the illumination light. Therefore, a clear image without shadow can be captured using the illumination light.

In surveillance camera 11, a blocking surface orthogonal to camera front glass 33 may be larger when light-shielding plate 67 is attached to wiper 41 compared to a case where wiper 41 alone is provided. Accordingly, a sunlight blocking effect that is equal to or greater than the effect acquired in a case where side surface light-shielding plates 55 are present is achieved.

Accordingly, in surveillance camera 11, the front glass of camera and the front glass of auxiliary imaging device can be cleaned without complicating the structure. The front glass as a front light-transmission plate may be made of a transparent resin, such as plastic, polycarbonate, acryl, and the like in addition to a glass plate.

(Other Exemplary Embodiments)

Hereinbefore, the first exemplary embodiment has been described as an example of the technique in the present disclosure. However, the technique in the present disclosure is not limited thereto. The technique in the present disclosure is applicable to exemplary embodiments in which changes, substitutions, additions, omissions or the like are made.

In the first exemplary embodiment, an example is given in which surveillance camera 11 includes two tilt-axes, and each housing is rotatable about each of tilt-axes. However, surveillance camera 11 may have any one of tilt-axes. In addition, surveillance camera 11 may not have a tilt-axis and thus may not tilt-rotate.

In the first exemplary embodiment, an example is given in which option detecting sensor 51 detects whether or not the auxiliary imaging device is added within auxiliary device addition space 35 and notifies controller 53 of detection results. However, a different method may be employed for controller 53 to recognize that the auxiliary imaging device is provided. For instance, using the user interface (UI) that is not illustrated, information regarding whether or not the auxiliary imaging device is provided is operation-input, thereby notifying controller 53 of the information.

In the first exemplary embodiment, the controller may have any physical configurations. In addition, if a programmable controller is used, the degree of freedom in designing the controller can be enhanced since a change in a program results in a processing content change. The controller may be configured of one semiconductor chip or may be physically configured of a plurality of semiconductor chips. In a case where the controller is configured of a plurality of semiconductor chips, each control in the first exemplary embodiment may be realized by each of different semiconductor chips. In this case, it is possible to consider that one controller is configured of the plurality of semiconductor chips. In addition, the controller may be configured of a member (capacitor or the like) that has a function different from that of semiconductor chips. In addition, the controller may be configured of one semiconductor chip such that the function of controller and a function different from that of controller are realized. In addition, a plurality of controllers may be configured of one controller.

What is claimed is:
1. An imaging apparatus comprising:
a camera front light-transmission plate that covers the front surface of a camera;
an auxiliary device addition space which has a virtual surface extended from an exterior surface of the camera front light-transmission plate;
an auxiliary imaging device, having a light-transmission surface, that is attachable to the camera at the auxiliary device addition space; and
a wiper that wipes the exterior surface of the camera front light-transmission plate by moving along the exterior surface and that moves to the virtual surface, wherein a moving range of the wiper is changed by control of a controller depending on whether the auxiliary imaging device is provided or not, and when the auxiliary imaging device is attached to the imaging apparatus at the auxiliary device addition space, the light-transmission surface is disposed along the virtual surface extended from the exterior surface of the camera front light-transmission plate such that the wiper is configured to wipe both the exterior surface and the light-transmission surface.

2. The imaging apparatus of claim 1,
wherein an illumination device is provided as the auxiliary imaging device, and
wherein the wiper is disposed between the camera front light-transmission plate and the illumination device during a non-illumination period of the illumination device, and the wiper is disposed on a side opposite to the illumination device with the camera front light-transmission plate being interposed between the wiper and the illumination device during an illumination period of the illumination device.

3. The imaging apparatus of claim 2,
wherein a light-shielding plate is attached to the wiper perpendicular to the exterior surface of the camera front light-transmission plate.

4. An imaging apparatus configured to be attached with an auxiliary imaging device comprising:
a first housing;
a camera that is disposed in the first housing;
a light transmission plate that covers a front surface of the camera; and
a wiper that moves within a first cleaning region when the auxiliary imaging device is attached to the imaging apparatus and moves within both the first cleaning region and a second cleaning region extended from the first cleaning region when the auxiliary imaging device is not attached to the imaging apparatus.

5. The imaging apparatus of claim 4, further comprising:
a sensor that detects the auxiliary imaging device being attached to the imaging apparatus, wherein
the wiper that moves within the first cleaning region when the sensor detects the auxiliary imaging device being attached to the imaging device and moves within both the first cleaning region and the second cleaning region when the sensor does not detect the auxiliary imaging device being attached to the imaging apparatus.

6. The imaging apparatus of claim 4, further comprising:
a shaft, connected to the wiper, about which the wiper rotates; and
a motor that drives the shaft, wherein
the motor is controlled so that the wiper moves within the first cleaning region when the auxiliary imaging device is attached to the imaging apparatus, and
the motor is controlled so that the wiper moves within both the first cleaning region and the second cleaning region when the auxiliary imaging device is not attached to the imaging apparatus.

7. The imaging apparatus of claim 4, wherein
the first housing includes a flat surface which is disposed behind the light transmission plate, is substantially parallel to the light transmission plate, and has an imaging light incident window through which imaging light is incident to the camera, and
the first cleaning range is broader than the imaging light incident window when viewed in a perpendicular direction to the flat surface.

8. The imaging apparatus of claim 7, wherein
a length of the wiper is greater than a maximum length of the imaging light incident window.

9. The imaging apparatus of claim 4, wherein
an end of the wiper is disposed at a first height from a mounting surface of the imaging apparatus when the wiper is disposed at a first end of the first cleaning region, and
the end of the wiper is disposed at a second height, being higher than the first height, from the mounting surface of the imaging apparatus when the wiper is disposed at a second end of the first cleaning region, the second end of the first cleaning region is closer to the second cleaning region than the first end of the first cleaning region.

10. The imaging apparatus of claim 9, wherein
the end of the wiper is disposed at a third height, being lower than the first height, from the mounting surface of the imaging apparatus when the wiper is disposed at an end of the second cleaning region, the end of the second cleaning region being opposite to the first cleaning region.

11. The imaging apparatus of claim 4, wherein
an end of the wiper has a higher position where the wiper is disposed at an end of the first cleaning region being opposite to the second cleaning region than where the wiper is disposed at an end of the second cleaning region being opposite to the first cleaning region.

12. The imaging apparatus of claim 4, further comprising:
a second housing that is disposed between the first housing and a mounting surface of the imaging apparatus; and
a support arm that connects between the first housing and the second housing and is disposed at a first side of the light transmission plate when viewed in an optical axis of the camera, wherein
the auxiliary imaging device is disposed at a second side, opposite to the first side, of the light transmission plate when the auxiliary imaging device is attached to the imaging apparatus.

13. The imaging apparatus of claim 12, further comprising:
a shaft, connected to the wiper, about which the wiper rotates, wherein
when the auxiliary imaging device is attached to the imaging apparatus, the shaft is closer to the auxiliary imaging device than the support art when viewed in the optical axis of the camera.

14. The imaging apparatus of claim 4, further comprising:
a plurality of light shielding plates which are disposed around an optical axis of the camera and substantially parallel to the optical axis of the camera, wherein
one of the light shielding plates is configured to be detachable from the imaging apparatus.

15. The imaging apparatus of claim 14, wherein
the one of the light shielding plates configured to be detachable from the imaging apparatus is disposed at a position corresponding to an end of the first cleaning region.

16. The imaging apparatus of claim 4, wherein
the auxiliary imaging device comprises a light source.

17. An imaging apparatus configured to be attached with an auxiliary imaging device comprising:
a first housing that includes a flat surface having an imaging light incident window;
a camera that is disposed in the first housing and receives imaging light through the imaging light incident window;

a light transmission plate, substantially parallel to the flat surface of the first housing, that covers the imaging light incident window is disposed in front of the flat surface; and a wiper that moves within a first cleaning region when the auxiliary imaging device is attached to the imaging apparatus and moves within both the first cleaning region and a second cleaning region extended from the first cleaning region when the auxiliary imaging device is not attached to the imaging apparatus.

* * * * *